United States Patent
Kumar et al.

(10) Patent No.: US 10,769,430 B2
(45) Date of Patent: Sep. 8, 2020

(54) METHOD AND SYSTEM FOR CORRECTING FABRICATION IN A DOCUMENT

(71) Applicant: Wipro Limited, Bangalore (IN)

(72) Inventors: Aayush Kumar, Dhanbad (IN); Manmohan Kumar, Bhagalpur (IN); Janki Rao Upada, Ganjam (IN)

(73) Assignee: Wipro Limited, Bangalore (IN)

( * ) Notice: Subject to any disclaimer, the term of this patent is extended or adjusted under 35 U.S.C. 154(b) by 185 days.

(21) Appl. No.: 16/049,235

(22) Filed: Jul. 30, 2018

(65) Prior Publication Data

US 2019/0377943 A1 Dec. 12, 2019

(30) Foreign Application Priority Data

Jun. 12, 2018 (IN) .............................. 2018/41021982

(51) Int. Cl.
*G06K 9/00* (2006.01)
*G06F 40/166* (2020.01)

(52) U.S. Cl.
CPC ....... *G06K 9/00483* (2013.01); *G06F 40/166* (2020.01); *G06K 9/00463* (2013.01)

(58) Field of Classification Search
CPC combination set(s) only.
See application file for complete search history.

(56) References Cited

U.S. PATENT DOCUMENTS

| | | | |
|---|---|---|---|
| 5,751,854 A * | 5/1998 | Saitoh | G06K 9/46 382/218 |
| 7,965,894 B2 | 6/2011 | Tian et al. | |
| 9,191,205 B2 | 11/2015 | Moskowitz | |
| 9,607,038 B2 | 3/2017 | Byrne et al. | |
| 2009/0141962 A1* | 6/2009 | Borgia | G06Q 20/04 382/139 |
| 2013/0170749 A1 | 7/2013 | Tian | |
| 2015/0170002 A1* | 6/2015 | Szegedy | G06K 9/4628 382/156 |
| 2017/0337682 A1* | 11/2017 | Liao | G06T 7/30 |

OTHER PUBLICATIONS

Huang, Mask R-CNN with Pyramid Attention Network for Scene Text Detection, IEEE, 2019 (Year: 2019).*

* cited by examiner

*Primary Examiner* — Alex Kok S Liew
(74) *Attorney, Agent, or Firm* — Finnegan, Henderson, Farabow, Garrett & Dunner, LLP

(57) ABSTRACT

A method and fabrication correction system for correcting fabrication in a document receives an input document from a user and identifies a reference document based on one of a plurality of categories of the input document from reference document database. The fabrication correction system detects fabrication in input document based on a predefined machine learning technique, by comparing one or more parameters associated with the input document with corresponding one or more parameters of the reference document and determines fabricated regions in the input document and a type of the fabrication in each of the one or more fabricated regions, based on one or more predefined techniques. Thereafter, one or more actions is performed in each of the one or more fabricated regions based on the type of the fabrication and the reference document, upon receiving a user input, for correcting the one or more fabricated regions.

21 Claims, 7 Drawing Sheets

303

| COMPANY NAME |
| :---: |
| ADDRESS |

SALARY SLIP

| STAFF CODE: _____ | PRESENTDAY: _____ |
| --- | --- |
| NAME: _____ | ABSENTDAY: _____ |
| DESIGNATION: _____ | HALFDAY: _____ |
| BRANCH: _____ | BANK NAME: _____ |
| MONTH: _____ | BRANCH NAME: _____ |

| EARNINGS | $ | DEDUCTION | $ |
| --- | --- | --- | --- |
| BASIC PAY: | _____ | ABSENT: | _____ |
| HR: | _____ | PF: | _____ |
| MEDICLAIM | _____ | TAX: | _____ |

| TOTAL | _____ |
| --- | --- |

CHECKED BY: _____

Fig. 3b

XT PRIVATE LIMITED
32, EAST MIAMI
TEL-6291872

SALARY SLIP

| STAFF CODE: | 1B2 | PRESENTDAY | 10 |
| NAME: | JEAN | ABSENTDAY: | 2 |
| DESIGNATION: | JN MANAGER | HALFDAY: | 1 |
| BRANCH: | EAST MIA | BANK NAME: | XX BANK |
| MONTH: | DEC | BRANCH NAME: | EAST ROAD |

| EARNINGS | $ | DEDUCTION | $ |
|---|---|---|---|
| BASIC PAY: | 24,009.00 | ABSENT: | 2000 |
| HR: | 1000 | PF: | 200 |
| MEDICLAIM | 500 | TAX: | 100 |
| TOTAL | | | 22,000 $ |
| CHECKED BY: | SMITH Q | | |

Fig.3c

METHOD AND SYSTEM FOR CORRECTING FABRICATION IN A DOCUMENT

This application claims the benefit of Indian Patent Application Serial No. 2018/41021982, filed Jun. 12, 2018, which is hereby incorporated by reference in its entirety.

FIELD

The present subject matter is related in general to document authentication, more particularly, but not exclusively to a method and system of correcting fabrication in a document.

BACKGROUND

With advent of technology, document sharing and storing has been taking place online. Due to online sharing, transfer, and storage of important documents, it has become a daunting task to check authenticity of the documents. There are instances where users have faced trouble while reading a document due to manipulation of a content in a shared document. Hence, there is a need to check authenticity of the content in the document before further processing.

At present, some existing methods verify authenticity of the documents. However, these methods fail to read the document in some scenarios, such as, when the document is in torn shape, fading of image due to spilling of water over the document and poor quality of print. Further, the existing methods may recognize only particular form and format of documents such as, data filled in a spreadsheet format, read image present above text and text below image supposed to be read in consonance with image and the like. In addition, the existing methods also fail to distinguish between lines present in tables, a form, and graphic image or to read a text present in the graphic image. Also, existing techniques used for fabricated region and symbol processing may reduce number of pixels due to which, it becomes difficult to identify a specific fabricated region in the document. Thus, the existing methods fail to identify and correct a fabrication in the document.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure may relate to a method of correcting fabrication in a document. The method comprises receiving an input document from a user and identifying a reference document based on one of a plurality of categories of the input document, from a reference document database. The method comprises detecting fabrication in the input document based on a predefined machine learning technique, by comparing one or more parameters associated with the input document with corresponding one or more parameters of the reference document. The method further comprises determining one or more fabricated regions in the input document and a type of the fabrication in each of the one or more fabricated regions, based on one or more predefined techniques. Finally, the method comprises performing one or more actions in each of the one or more fabricated regions based on the type of the fabrication and the reference document, upon receiving a user input, for correcting the one or more fabricated regions.

In an embodiment, the present disclosure may relate to a fabrication correction system for correcting fabrication in a document. The fabrication correction system may comprise a processor and a memory communicatively coupled to the processor, where the memory stores processor executable instructions, which, on execution, may cause the fabrication correction system to receive an input document from a user. The fabrication correction system identifies a reference document based on one of a plurality of categories of the input document, from a reference document database. Thereafter, the fabrication correction system detects fabrication in the input document based on a predefined machine learning technique, by comparing one or more parameters associated with the input document with corresponding one or more parameters of the reference document. Further, the fabrication correction system determines one or more fabricated regions in the input document and a type of the fabrication in each of the one or more fabricated regions, based on one or more predefined techniques. Finally, the fabrication correction system performs one or more actions in each of the one or more fabricated regions based on the type of the fabrication and the reference document, upon receiving a user input, for correcting the one or more fabricated regions.

In an embodiment, the present disclosure relates to a non-transitory computer readable medium including instructions stored thereon that when processed by at least one processor may cause a fabrication correction system to receive an input document from a user. The fabrication correction system identifies a reference document based on one of a plurality of categories of the input document, from a reference document database. Thereafter, the fabrication correction system detects fabrication in the input document based on a predefined machine learning technique, by comparing one or more parameters associated with the input document with corresponding one or more parameters of the reference document. Further, the fabrication correction system determines one or more fabricated regions in the input document and a type of the fabrication in each of the one or more fabricated regions, based on one or more predefined techniques. Finally, the fabrication correction system performs one or more actions in each of the one or more fabricated regions based on the type of the fabrication and the reference document, upon receiving a user input, for correcting the one or more fabricated regions.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 3a, FIG. 3b and FIG. 3c show exemplary representations for correcting fabrication in a payment slip of a user in accordance with some embodiments of the present disclosure;

Figure 1:
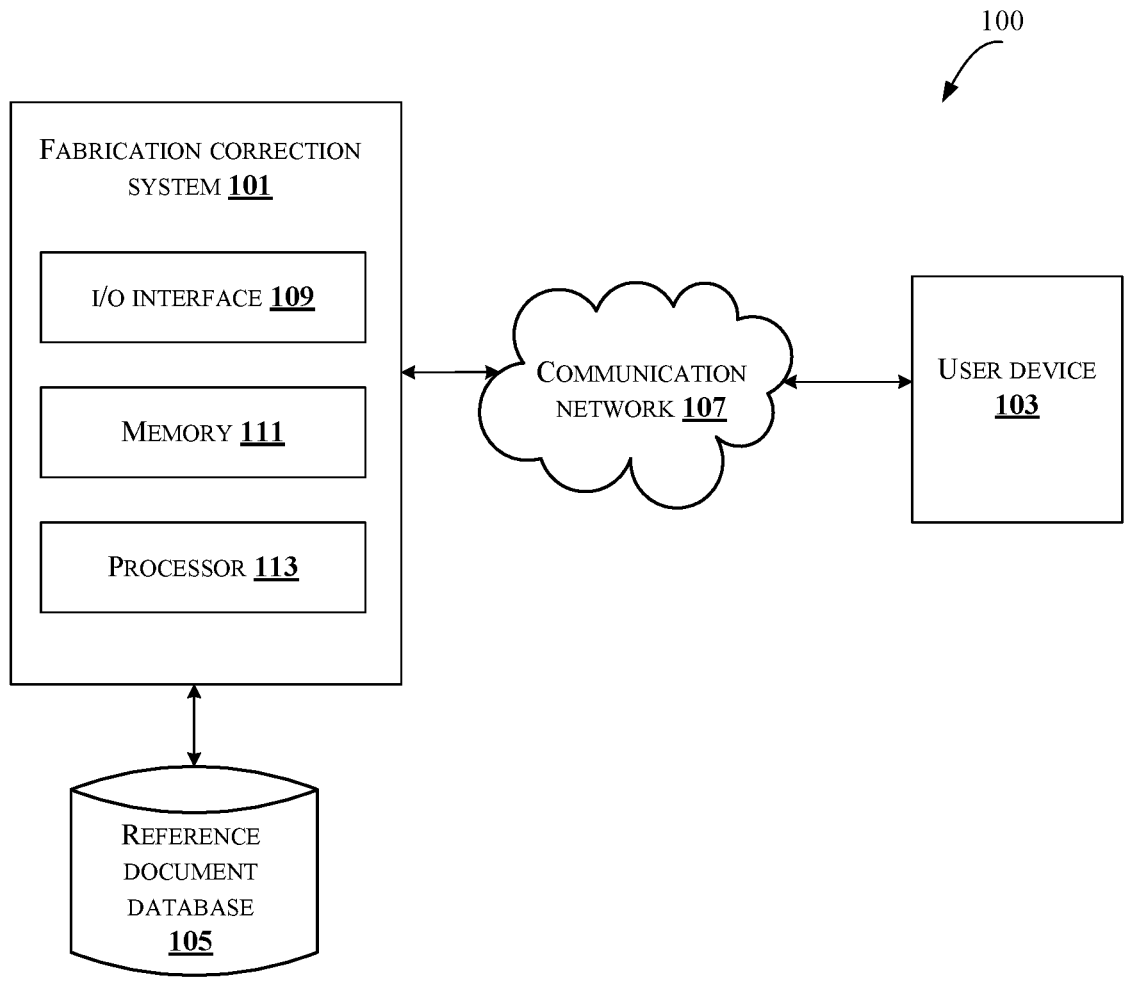
FIG. 1 illustrates an exemplary environment for correcting fabrication in a document in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Embodiments of the present disclosure relates to a method and a fabrication correction system for correcting fabrication in a document. In an embodiment, the document may be a printed, or electronic document with one or more information. The fabrication correction system may receive an input document from a user. A fabrication in the input document may be detected using predefined machine learning technique, based on a reference document retrieved from a database. Fabricated regions in the input document may be determined along with a type of fabrication based on one or more predefined techniques. Thereafter, the fabrication correction system may correct the fabricated regions by performing actions using the reference document and the type of the fabrication. The present disclosure determines and corrects fabricated regions efficiently.

FIG. 1 illustrates an exemplary environment for correcting fabrication in a document in accordance with some embodiments of the present disclosure.

As shown in FIG. 1, an environment 100 includes a fabrication correction system 101 connected through a communication network 107 to a user device 103. The fabrication correction system 101 may also be connected to a reference document database 105. In one embodiment, the user device 103 may be a document processing device such as a scanner and the like. In another embodiment, the user device 103 may be a computing system, for example a laptop, a desktop computer, a Personal Digital Assistant (PDA), a notebook, a smartphone, a tablet, and any other computing devices. A person skilled in the art would understand that the scope of the present disclosure may encompass any other device designed for processing a document, not mentioned herein explicitly. For instance, the fabrication correction system 101 may receive an input document through an email from the computing system, for example the laptop. Further, the communication network 107 may include, but is not limited to, a direct interconnection, an e-commerce network, a Peer-to-Peer (P2P) network, Local Area Network (LAN), Wide Area Network (WAN), wireless network (for example, using Wireless Application Protocol), Internet, Wi-Fi and the like. Generally, documents may get fabricated due to a variety of reasons.

The fabrication correction system 101 may determine fabrication in a document and correct the fabrication. In one embodiment, the fabrication correction system 101 may include, but is not limited to, a laptop, a desktop computer, a Personal Digital Assistant (PDA), a notebook, a smartphone, a tablet, a server, and any other computing devices. A person skilled in the art would understand that, any other devices, not mentioned explicitly, may also be used as the fabrication correction system 101 in the present disclosure. The fabrication correction system 101 may include an I/O interface 109, a memory 111 and a processor 113. The I/O interface 109 may be configured to receive the input document from the user device 103. The input document received from the I/O interface 109 may be stored in the memory 111. The memory 111 may be communicatively coupled to the processor 113 of the fabrication correction system 101. The memory 111 may also store processor instructions which may cause the processor 113 to execute the instructions for correcting the fabrication in the document.

In an implementation, the fabrication correction system 101 may be configured as a standalone device or may be integrated with computing systems. In an embodiment, the fabrication correction system 101 may include an Unsupervised Machine Learning (USML) classifier. Initially, the fabrication correction system 101 may train the Unsupervised Machine Learning (USML) classifier based on a plurality of training documents. The plurality of training documents may belong to different categories such as social media related documents, official documents and non-official documents. The official document may include, for example a pay slip of an organization and the like. The non-official document may include, for example, bank statement, telephone bill and the like. The social media related document may include, for example a watermarked painting and the like. A person skilled in the art would understand that any other category, not mentioned explicitly, may also be included in the present disclosure. Once the USML classifier is trained, a plurality of reference documents associated with each category of the document may be stored in the reference document database 105.

In real-time, the fabrication correction system 101 may receive the input document from the user device 103, associated with a user. In an embodiment, the input document may be a scanned printed document. In an embodiment, the input document may include at least one of text and one or more images. The fabrication correction system 101 may analyse one or more parameters of the input document. As an example, the one or more parameters may include, but are not limited to, text, font of the text, pixel, height, and width associated with at least one of text and one or more images in the input document. Further, the fabrication correction system 101 may retrieve a reference document based on one of a plurality of categories of the input document from the reference document database 105. In an embodiment, the category of the input document is identified based on the one or more parameters associated with the input document. The fabrication correction system 101 may detect a fabrication in the input document based on a predefined machine learning technique. As an example, the predefined machine learning technique may include Generative Adversarial Network (GAN). The fabrication may be detected by comparing the one or more parameters associated with the input document with one or more parameters of the reference document.

On detecting the fabrication, the fabrication correction system 101 may determine one or more fabricated regions in the input document along with a type of the fabrication in each of the one or more fabricated regions using one or more predefined techniques. As an example, the one or more predefined technique may include Mask Region Convolutional Neural Network (R-CNN), fast R-CNN and Region Proposal Network (RPN) techniques. A person skilled in the art would understand that the any other techniques, not mentioned explicitly, may also be used in the present disclosure. In an embodiment, the type of the fabrication may include, but is not limited to, variation in alignment, font, wavelength, syntax pixels, ink characteristics and opacity or nature of distortion associated with at least one of text and one or more images of the input document.

The fabrication correction system 101 may provide a notification to the user on determining the one or more fabricated regions in the input document. The user, upon receiving the notification may provide a user input to correct the one or more fabricated regions. Thereafter, the fabrication correction system 101 may perform one or more actions on each of the one or more fabricated regions based on the type of the fabrication and the reference document. In an embodiment, the one or more actions may be performed on the one or more fabricated regions. The one or more actions may comprise generating a new input document by correcting each of the one or more fabricated regions using the type of the fabrication and the reference document.

Figure 2:
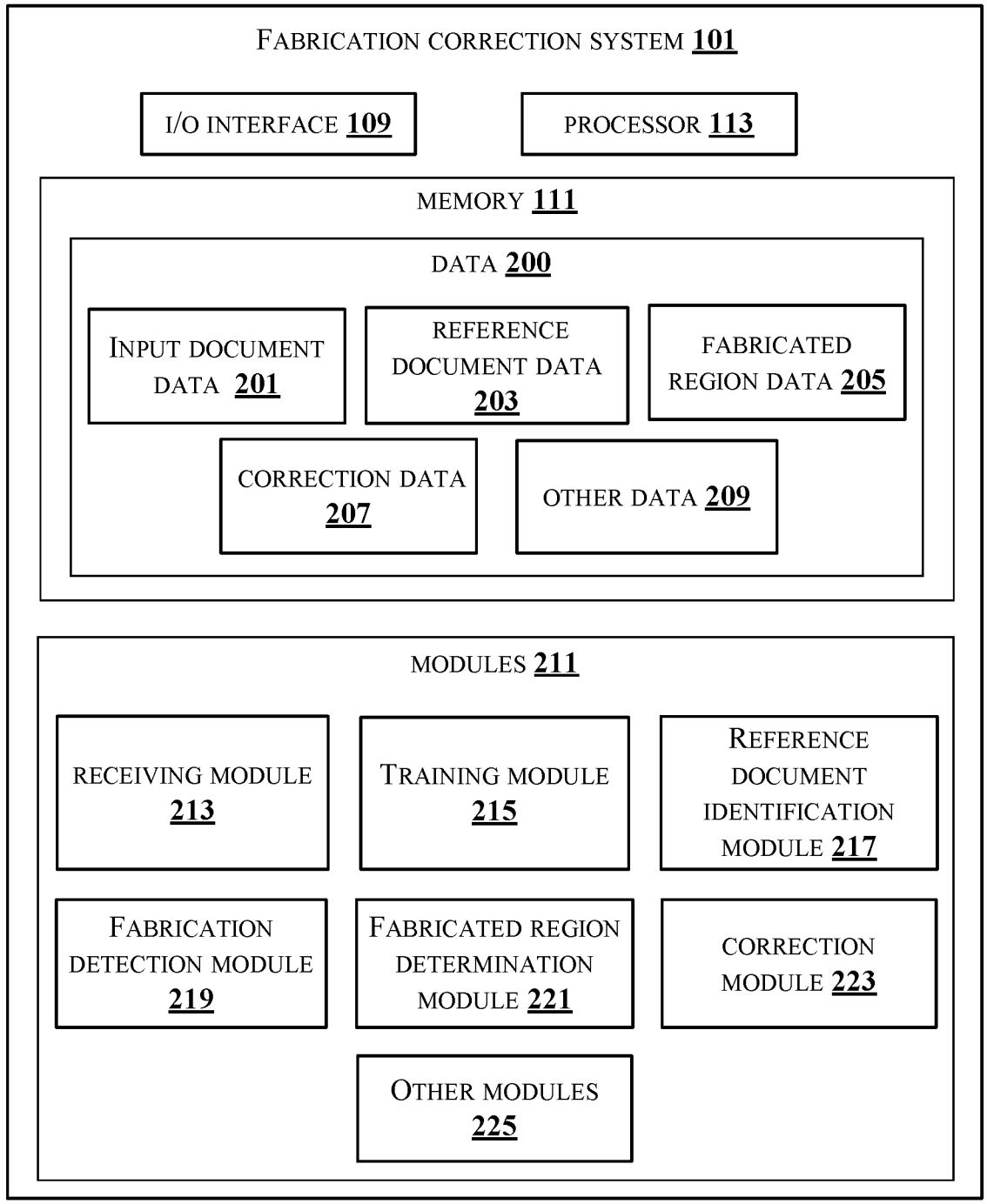
FIG. 2 shows a detailed block diagram of a fabrication correction system in accordance with some embodiments of the present disclosure.

FIG. 2 shows a detailed block diagram of a fabrication correction system in accordance with some embodiments of the present disclosure.

The fabrication correction system 101 may include data 200 and one or more modules 211 which are described herein in detail. In an embodiment, the data 200 may include input document data 201, reference document data 203, fabricated region data 205, correction data 207 and other data 209.

The input document data 201 may include details associated with the input document received from the user. The details may include information on the one or more parameters of the input document and the category of the input document. In an embodiment, the one or more parameters may include text, font of the text, pixel, height, and width associated with at least one of text and one or more images in the input document. In an embodiment, the category of the input document may be identified based on the one or more parameters associated with the input document. For example, the category for a text document for example, a pay slip may be identified based on text-font, number of text in each line for indexing and the like. Further, in case of an image document, for example, product architecture diagram, the category may be identified based on pixel level information, height, and width of images in the image document.

The reference document data 203 may include the plurality of reference documents stored during training phase. The plurality of reference documents may be used for determining fabrication in the input document. The plurality of reference documents may be stored based on corresponding category. In an embodiment, the category may include, but is not limited to, official document, non-official document, and social media related document. Further, the reference document data 203 may include information on the one or more parameters associated with each of the plurality of reference documents.

The fabricated region data 205 may include details regarding the one or more fabricated regions in the input document. The details may include the type of the fabrication in each of the one or more fabricated regions. In an embodiment, the type of the fabrication may include variation in alignment, font, wavelength, syntax pixels, ink characteristics and opacity or nature of distortion associated with at least one of text and one or more images of the input document.

The correction data 207 may include details regarding the one or more actions performed to correct the one or more fabricated regions. In an embodiment, the correction data 207 may include details regarding the one or more actions performed for generating the new input document.

The other data 209 may store data, including temporary data and temporary files, generated by modules 211 for performing the various functions of the fabrication correction system 101.

In an embodiment, the data 200 in the memory 111 are processed by the one or more modules 211 of the fabrication correction system 101. As used herein, the term module refers to an Application Specific Integrated Circuit (ASIC), an electronic circuit, a field-programmable gate arrays (FPGA), Programmable System-on-Chip (PSoC), a combinational logic circuit, and/or other suitable components that provide the described functionality. The said modules 211 when configured with the functionality defined in the present disclosure will result in a novel hardware.

In one implementation, the one or more modules 211 may include, but are not limited to a receiving module 213, a training module 215, a reference document identification module 217, a fabrication detection module 219, a fabricated region determination module 221 and a correction module 223. The one or more modules 211 may also include other modules 225 to perform various miscellaneous functionalities of the fabrication correction system 101. In an embodiment, the other modules 225 may include a category determination module, a notification providing module and a text convertor module. The category determination module may determine the category for the input document based on the one or more parameters associated with the input document. The notification providing module may provide the notification to the user regarding the one or more fabricated regions in the input document. The text convertor module may convert the text associated with the one or more fabricated regions to speech for providing to the user.

The receiving module 213 may receive the input document from the user device 103. In an embodiment, the user device 103 may be a scanner which may scan the input document. In an embodiment, the input document may be received from the computing system such as a smart phone. For example, the receiving module 213 may receive the input document through an email from the smart phone. The input document may include at least one text and one or more images.

The training module 215 may train the USML classifier using the plurality of training documents. In an embodiment, the USML classifier may be based on the GAN technique. In an embodiment, GANs may refer to neural networks comprising two networks, competing with each other. In an embodiment, the two networks namely, a generator for generating data set and a discriminator to validate the data set. During training phase, the generator may generate a sample document for each of plurality of training document and the discriminator may compare the sample document with corresponding original training document to identify fabrication. On identifying fabrication, the discriminator may determine the type and region of fabrication and input the details to the generator. The generator may regenerate the sample document by correcting the fabrication and provide to the discriminator to identify further fabrication. The training phase may be performed until the generator and the discriminator are trained and a Nash Equilibrium is obtained for the plurality of training documents. In an embodiment, the Nash equilibrium is a stable state at which both the discriminator and the generator may be trained such that the discriminator may not identify any further fabrication in the document and hence the generator may not generate a document by correcting the sample document.

The reference document identification module 217 may identify the reference document for the input document based on the category of the input document. The reference document identification module 217 may receive the category of the input document from the category determination module and retrieve the reference document which matches the category of the sample document from the reference document database 105.

The fabrication detection module 219 may detect the fabrication in the input document by comparing the one or more parameters associated with the input document with corresponding one or more parameters of the reference document retrieved from the reference document database 105. In an embodiment, one of text and one or more images in the input document. For example, consider, on comparing, the pixel and width associated with the text in a region of the input document may be detected as different with reference to the pixel and width of text in the region of the reference document corresponding to the region of the reference document. In such case, the fabrication detection module 219 may detect the input document to be fabricated. In an embodiment, the fabrication detection module 219 may detect the fabrication based on the comparison using the predefined machine learning technique. In an embodiment, the predefined machine learning technique may be a GAN technique.

The fabricated region determination module 221 may determine the one or more fabricated regions in the input document along with the type of the fabrication in each of the one or more fabricated regions based on the one or more predefined techniques. In an embodiment, one or more fabricated regions may be determined based on R-CNN and RPN techniques. In an embodiment, the input document may be segmented, and one or more boundaries may be identified for each of the segmented regions. In an embodiment, Mask R-CNN may detect location as well as exact boundary of fabricated region and may pioneer RPN which may share convolution property and may include free region proposals. In an embodiment, the RPN technique is a fully convolutional network to simultaneously predict object bounds and object scores at each position. The RPN technique is trained end-to-end to generate high-quality region proposals, which may be used by Fast R-CNN technique for fabrication detection. In an embodiment, features from RPN and MASK R-CNN may be merged by sharing respective convolutional features. Further, the fabricated region determination module 221 may determine the type of the fabrication in each of the one or more fabricated region based on Discrete Wavelet Transform (DWT) technique. In an embodiment, the type of the fabrication may include variation in alignment, font, wavelength, syntax pixels, ink characteristics and opacity or nature of distortion associated with at least one of text and one or more images of the input document. In an embodiment, the input document may be compared with the reference document to determine the type of the fabrication. For example, the input document may be a passbook statement and the type of the fabrication may be determined as variation in ink characteristics of text in the passbook statement.

The correction module 223 may correct the one or more fabricated regions by performing the one or more actions in each of the one or more fabricated regions. The correction module 223 may perform the one or more actions upon receiving the user input for correcting the one or more fabricated regions. The correction module 223 corrects the one or more fabricated regions by generating a new input document, based on the predefined machine learning technique. The new input document is generated by correcting each of the one or more fabricated regions using the type of the fabrication and the reference document. For example, the type of the fabrication is variation in ink characteristics in middle portion of the passbook statement. In such case, the correction module 223 may generate the new passbook statement by correcting the ink characteristics in the middle portion based on the ink characteristics of the reference passbook statement.

Figure 3A:
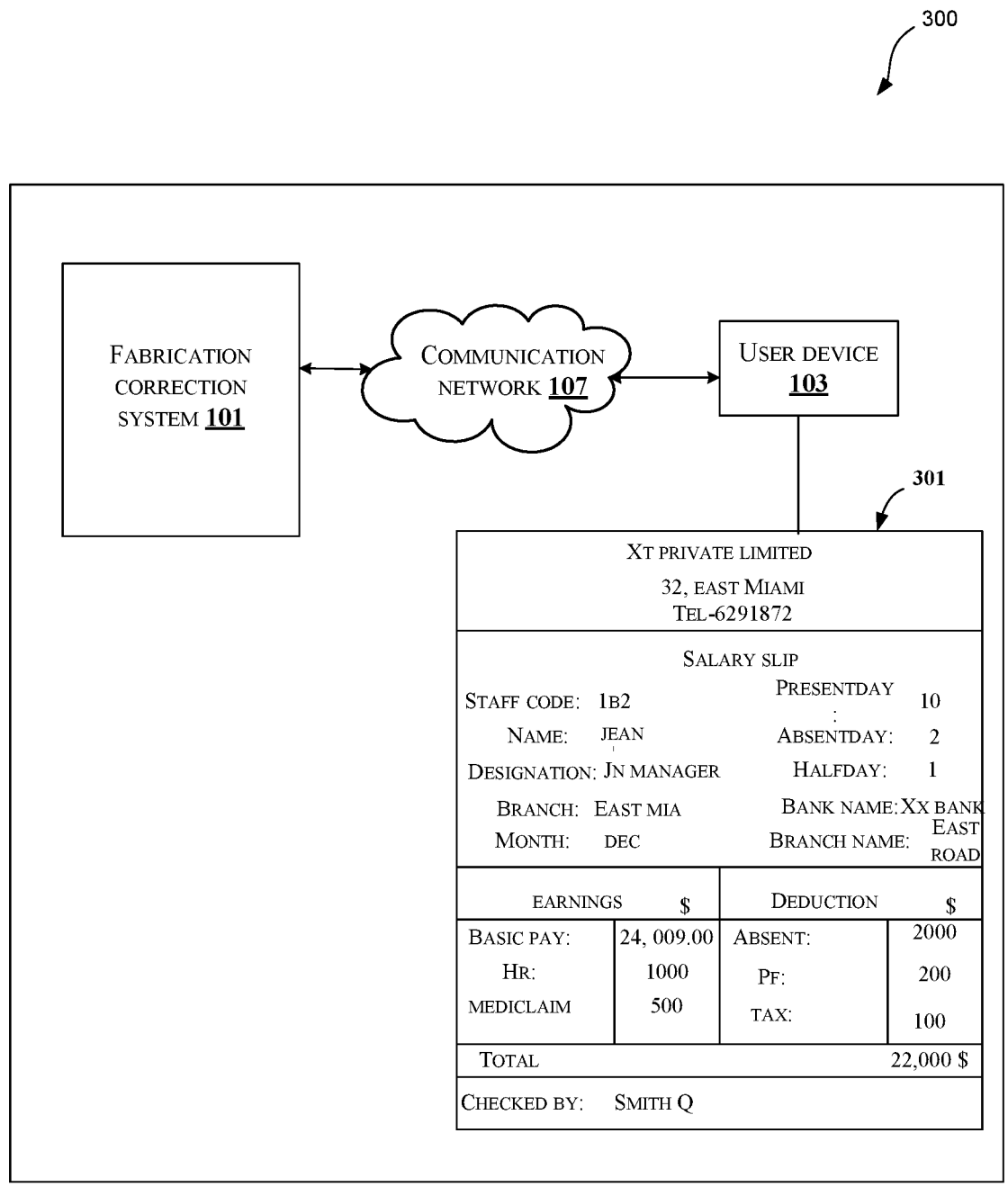

FIG. 3a, FIG. 3b and FIG. 3c show exemplary representations for correcting fabrication in a payment slip of a user in accordance with some embodiments of the present disclosure Referring now to FIG. 3a, an exemplary representation 300 for correcting fabrication in a document, for example a payment slip of a user is illustrated. The exemplary representation 300 includes the fabrication correction system 101 connected to the user device 103 associated with the user. In an embodiment, the fabrication correction system 101 may be connected to the reference document database 105 (not shown explicitly in FIG. 3a). To correct fabrication for documents, the fabrication correction system 101 may train the USML classifier previously using the plurality of training documents. For example, consider, the fabrication correction system 101 may train the USML classifier with a plurality of training payment slip format of different organization. After training, the plurality of reference documents may be stored based on corresponding category of the reference documents.

In real time, the fabrication correction system 101 may receive the input document from the user device 103. In the present case, the fabrication correction system 101 may receive a payment slip document 301 from the user device 103. On receiving the payment slip document, the fabrication correction system 101 may analyse the one or more parameters associated with the payment slip document 301 and identify the category associated with the payment slip document 301. The one or more parameters may include, but is not limited to, text, font of the text, pixel, height, and width associated with the text in the payment slip document 301. The fabrication correction system 101 may identify the category of the payment slip document 301 as official document based on the one or more parameters. Further, the fabrication correction system 101 may identify the reference document from the reference document database 105 based on the one or more parameters and category of the payment slip document 301, i.e., an official reference payment slip document 303 associated with the payment slip may be retrieved from the reference document database 105. FIG. 3b shows the reference payment slip document 303 retrieved from the reference document database 105.

The fabrication correction system 101 may compare the one or more parameters of the payment slip document 301 with corresponding one or more parameters of the reference payment slip document 303 and detects fabrication based on the predefined machine learning technique. In an embodiment, the USML classifier in the fabrication correction system 101 may be trained to detect fabrication in the document. Further, the fabrication correction system 101 may determine the one or more fabricated regions in the payment slip document 301 along with the type of the fabrication in each of the one or more fabricated regions based on the one or more predefined techniques. In an embodiment, the one or more predefined techniques may include Mask R-CNN, RPN and DWT technique. The fabrication correction system 101 may segment the payment slip document 301 and identify boundaries and location for each segment using the Mask R-CNN technique and determine the one or more fabricated regions using RPN technique. Consider, in the present case, the fabrication correction system 101 may determine a header of the payment slip document 301 as the fabricated region. Further, using the DWT technique, the fabrication correction system 101 may determine the type of the fabrication as variation in pixels in the header of the payment slip document 301. FIG. 3c shows the fabricated region in payment slip document 301. As shown in the FIG. 3c, company name in the header region of the payment slip document 301 is highlighted and circled as the fabricated region. The company name may include variations in font type. In such case, the fabrication correction system 101 may notify the user on determining the one or more fabricated regions in the payment slip document 301. In an embodiment, the user may be notified with the fabricated region by providing a speech input. In an embodiment, the user may either instruct to correct the fabricated regions or may not proceed with the correction. Consider, the user may provide user input to correct the fabricated regions in the payment slip document 301. The fabrication correction system 101 may perform one or more actions in the payment slip document 301 to correct the fabricated regions. The fabrication correction system 101 may generate a new payment slip document by correcting the header in the payment slip based on the reference payment slip 303. Typically, the fabrication correction system 101 may generate the new payment slip document by correcting the front type in the header of the payment slip document 301. Thus, the generated new payment slip document may be provided to the user after correction.

Figure 4:
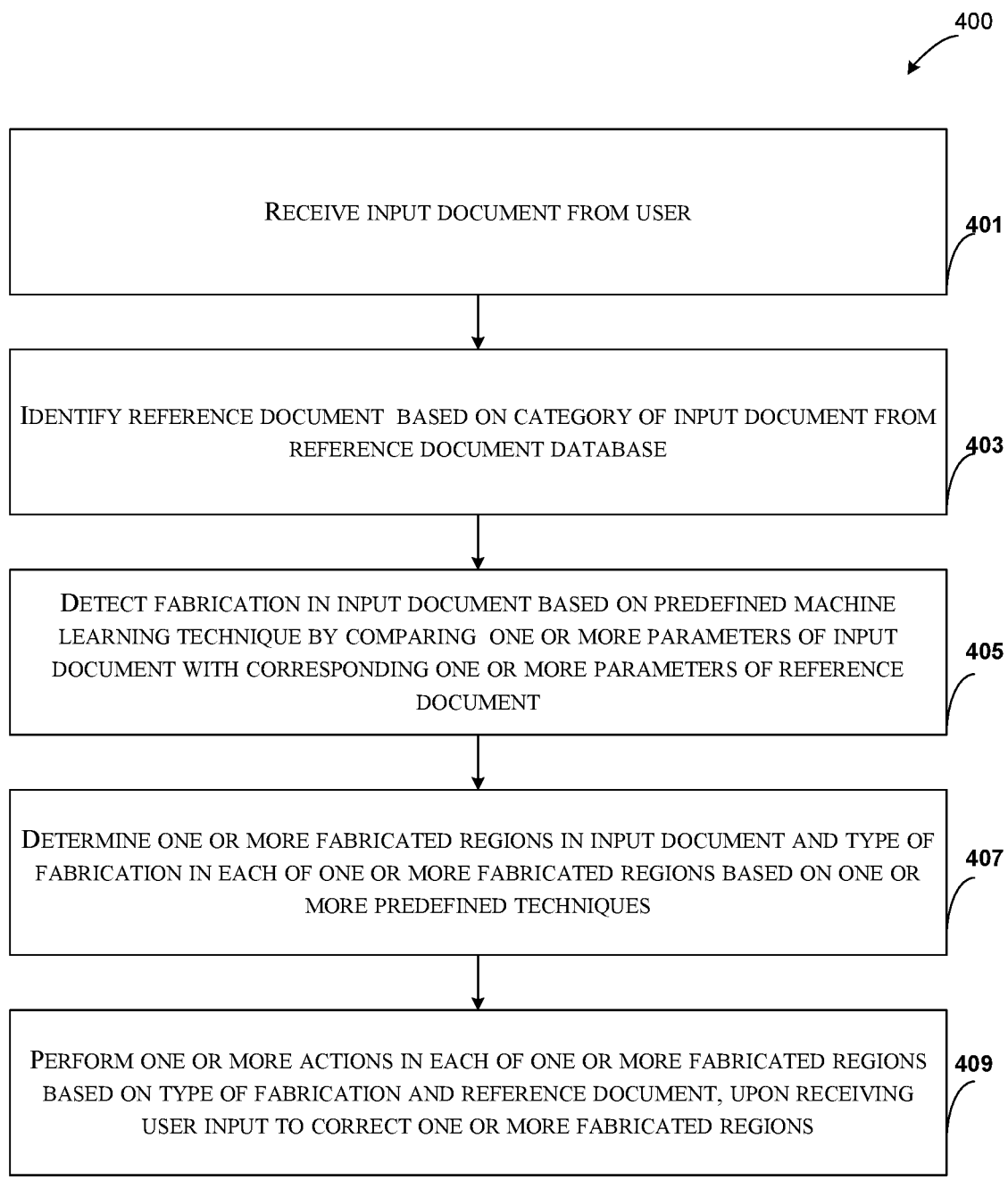
FIG. 4 illustrates a flowchart showing a method for correcting fabrication in a document in accordance with some embodiments of present disclosure.

FIG. 4 illustrates a flowchart showing a method for correcting a fabrication in a document in accordance with some embodiments of present disclosure.

As illustrated in FIG. 4, the method 400 includes one or more blocks for correcting a fabrication in a document. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 401, the input document may be received, by the receiving module 213 from the user device 103 associated with the user. In an embodiment, the input document may include at least one of text and one or more images.

At block 403, the reference document may be identified, by the reference document identification module 217 based on the category of the input document, from the reference document database 105.

At block 405, the fabrication in the input document may be detected, by the fabrication detection module 219 based on the predefined machine learning technique and by comparing the one or more parameters associated with the input document with corresponding one or more parameters of the reference document. In an embodiment, the predefined machine learning technique is Generative Adversarial Network (GAN).

At block 407, the one or more fabricated regions may be determined, by the fabricated region determination module 221, in the input document along with the type of the fabrication in each of the one or more fabricated regions based on one or more predefined techniques. In an embodiment, the one or more predefined techniques may include mask R-CNN, fast R-CNN, and DWT technique.

At block 409, the one or more actions in each of the one or more fabricated regions may be performed, by the correction module 223, based on the type of the fabrication and the reference document, upon receiving the user input for correcting the one or more fabricated regions.

Figure 5:
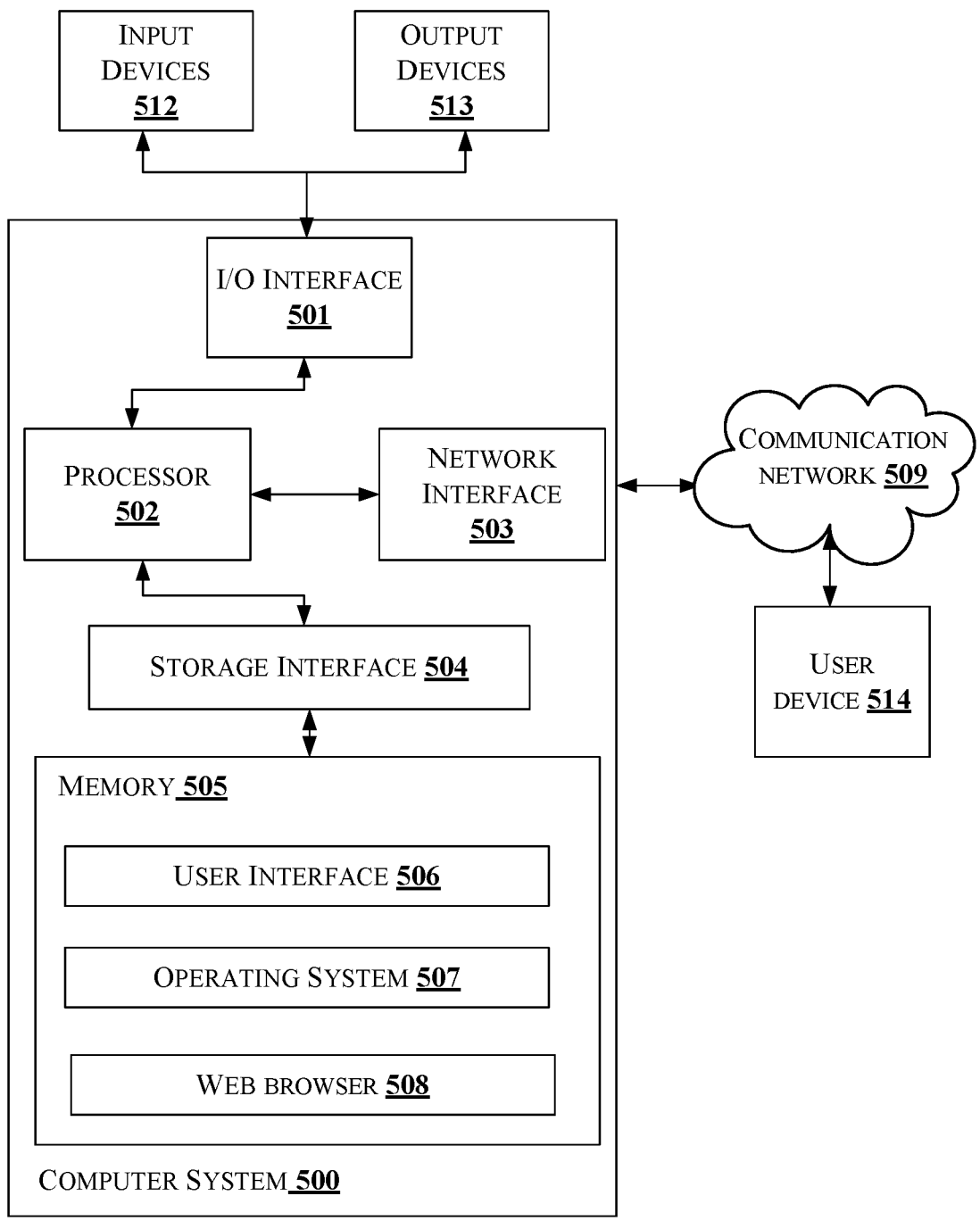
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 may be used to implement the fabrication correction system 101. The computer system 500 may include a central processing unit ("CPU" or "processor") 502. The processor 502 may include at least one data processor for correcting fabrication in a document. The processor 502 may include specialized processing units such as, integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 500 consists of the fabrication correction system 101. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 509 may include, without limitation, a direct interconnection, local area network (LAN), wide area network (WAN), wireless network (e.g., using Wireless Application Protocol), the Internet, etc. Using the network interface 503 and the communication network 509, the computer system 500 may communicate with a user device 514. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 509 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507 etc. In some embodiments, computer system 500 may store user/application data 506, such as, the data, variables, records, etc., as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system 500 may implement a web browser 508 stored program component. The web browser 508 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 508 may utilize facilities such as AJAX™, DHTML™, ADOBE® FLASH™, JAVASCRIPT™, JAVA™, Application Programming Interfaces (APIs), etc. In some embodiments, the computer system 500 may implement a mail server stored program component. The mail server may be an Internet mail server such as Microsoft Exchange, or the like. The mail server may utilize facilities such as ASP™, ACTIVEX™, ANSI™ C++/C #, MICROSOFT®, .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 500 may implement a mail client stored program component. The mail client may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read- Only Memory (ROM), volatile memory, non-volatile memory, hard drives, CD ROMs, DVDs, flash drives, disks, and any other known physical storage media.

An embodiment of the present disclosure enhances capabilities to maintain authenticity of a document.

In an embodiment of the present disclosure efficiency for correcting the fabricated document is exponentially high due to the trained GAN networks.

An embodiment of the present disclosure determines fabrication in a document efficiently using a machine learning technique.

An embodiment of the present disclosure prevents violation of copyrights.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fiber, copper wire, etc. The transmission signals in which the code or logic is encoded may further include a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of correcting a fabrication in a document, the method comprising:
receiving, by a fabrication correction system, an input document from a user;
identifying, by the fabrication correction system, a reference document based on a category of the input document, from a reference document database;
detecting, by the fabrication correction system, fabrication indicating distortion associated with at least one of text and one or more images of the input document based on a predefined machine learning technique, by comparing one or more parameters associated with the input document with corresponding one or more parameters of the reference document;
determining, by the fabrication correction system, one or more fabricated regions in the input document and a type of the fabrication in each of the one or more fabricated regions, based on one or more predefined techniques, by:
  identifying one or more boundaries for multiple segmented regions in the input document using Mask Region Convolutional Neural Network (R-CNN) technique;
  generating region-proposals indicating location and boundary of fabricated regions in the input document, by applying Region Proposal Network (RPN) technique in combination with Fast R-CNN technique on each segment in the input document; and
  determining the type of the fabrication in each of the one or more fabricated region based on Discrete Wavelet Transform (DWT) technique, wherein the type of the fabrication comprises variation in alignment, font, wavelength, syntax pixels, ink characteristics and opacity and nature of distortion associated with the at least one of text and one or more images of the input document; and
performing, by the fabrication correction system, one or more actions in each of the one or more fabricated regions based on the type of the fabrication and the reference document, upon receiving a user input, for correcting the one or more fabricated regions.

2. The method as claimed in claim 1, wherein the category of the input document is identified based on the one or more parameters associated with the input document.

3. The method as claimed in claim 1, wherein the category comprises official document, non-official document, and social media related document.

4. The method as claimed in claim 2, wherein the one or more parameters comprises text, font of the text, pixel, height, and width associated with the at least one of text and one or more images in the input document.

5. The method as claimed in claim 1 further comprising:
  providing a notification to the user upon detecting the fabrication; and
  receiving the user input for correction of the one or more fabricated regions.

6. The method as claimed in claim 1, wherein performing the one or more actions in the one or more fabricated regions comprises generating a new input document, based on the predefined machine learning technique, by correcting each of the one or more fabricated regions using the type of the fabrication and the reference document.

7. The method as claimed in claim 1, wherein the predefined machine learning technique is Generative Adversarial Network (GAN).

8. A fabrication correction system for correcting a fabrication in a document, comprising:
  a processor; and
  a memory communicatively coupled to the processor, wherein the memory stores processor instructions, which, on execution, causes the processor to:
  receive an input document from a user;
  identify a reference document based on a category of the input document, from a reference document database;
  detect fabrication indicating distortion associated with at least one of text and one or more images of the input document based on a predefined machine learning technique, by comparing one or more parameters associated with the input document with corresponding one or more parameters of the reference document;
  determine one or more fabricated regions in the input document and a type of the fabrication in each of the one or more fabricated regions, based on one or more predefined techniques, by:
    identifying one or more boundaries for multiple segmented regions in the input document using Mask Region Convolutional Neural Network (R-CNN) technique;
    generating region-proposals indicating location and boundary of fabricated regions in the input document, by applying Region Proposal Network (RPN) technique in combination with Fast R-CNN technique on each segment in the input document; and
    determining the type of the fabrication in each of the one or more fabricated region based on Discrete Wavelet Transform (DWT) technique, wherein the type of the fabrication comprises variation in alignment, font, wavelength, syntax pixels, ink characteristics and opacity and nature of distortion associated with the at least one of text and one or more images of the input document; and
  perform one or more actions in each of the one or more fabricated regions based on the type of the fabrication and the reference document, upon receiving a user input, for correcting the one or more fabricated regions.

9. The fabrication correction system as claimed in claim 8, wherein the processor identifies category of the input document based on the one or more parameters associated with the input document.

10. The fabrication correction system as claimed in claim 8, wherein the category comprises official document, non-official document, and social media related document.

11. The fabrication correction system as claimed in claim 9, wherein the one or more parameters comprises text, font of the text, pixel, height, and width associated with the at least one of text and one or more images in the input document.

12. The fabrication correction system as claimed in claim 8, wherein the processor:
  provides a notification to the user upon detecting the fabrication; and
  receives the user input for correction of the one or more fabricated regions.

13. The fabrication correction system as claimed in claim 8, wherein the processor performs the one or more actions in the one or more fabricated regions by generating a new input document, based on the predefined machine learning technique, by correcting each of the one or more fabricated regions using the type of the fabrication and the reference document.

14. The fabrication correction system as claimed in claim 8, wherein the predefined machine learning technique is Generative Adversarial Network (GAN).

15. A non-transitory computer readable medium including instruction stored thereon that when processed by at least one processor cause a fabrication correction system to perform operation comprising:
  receiving an input document from a user;
  identifying a reference document based on a category of the input document, from a reference document database;
  detecting fabrication indicating distortion associated with at least one of text and one or more images of the input document based on a predefined machine learning technique, by comparing one or more parameters associated with the input document with corresponding one or more parameters of the reference document;

determining one or more fabricated regions in the input document and a type of the fabrication in each of the one or more fabricated regions, based on one or more predefined techniques, by:
- identifying one or more boundaries for multiple segmented regions in the input document using Mask Region Convolutional Neural Network (R-CNN) technique;
- generating region-proposals indicating location and boundary of fabricated regions in the input document, by applying Region Proposal Network (RPN) technique in combination with Fast R-CNN technique on each segment in the input document; and
- determining the type of the fabrication in each of the one or more fabricated region based on Discrete Wavelet Transform (DWT) technique, wherein the type of the fabrication comprises variation in alignment, font, wavelength, syntax pixels, ink characteristics and opacity and nature of distortion associated with the at least one of text and one or more images of the input document; and performing one or more actions in each of the one or more fabricated regions based on the type of the fabrication and the reference document, upon receiving a user input, for correcting the one or more fabricated regions.

16. The non-transitory computer readable medium as claimed in claim 15, wherein the instruction causes the processor to identify the category of the input document based on the one or more parameters associated with the input document.

17. The non-transitory computer readable medium as claimed in claim 16, wherein the category comprises official document, non-official document, and social media related document.

18. The non-transitory computer readable medium as claimed in claim 16, wherein the one or more parameters comprises text, font of the text, pixel, height, and width associated with the at least one of text and one or more images in the input document.

19. The non-transitory computer readable medium as claimed in claim 15, wherein the instruction causes the processor to:
- provide a notification to the user upon detecting the fabrication; and
- receive the user input for correction of the one or more fabricated regions.

20. The non-transitory computer readable medium as claimed in claim 15, wherein the instruction causes the processor to perform the one or more actions in the one or more fabricated regions by generating a new input document, based on the predefined machine learning technique, by correcting each of the one or more fabricated regions using the type of the fabrication and the reference document.

21. The non-transitory computer readable medium as claimed in claim 15, wherein the predefined machine learning technique is Generative Adversarial Network (GAN).

* * * * *